United States Patent [19]

Fernandez

[11] 3,971,137

[45] July 27, 1976

[54] SYSTEM FOR MILLESIMAL MEASURE

[75] Inventor: Pablo Martinez Fernandez, Madrid, Spain

[73] Assignee: Francisco Martin Martin, Burgos, Spain

[22] Filed: Dec. 17, 1973

[21] Appl. No.: 425,296

[30] Foreign Application Priority Data
Dec. 15, 1972 Spain .................................. 409638

[52] U.S. Cl. .............................. 33/164 R; 33/165
[51] Int. Cl.² ......................................... G01B 3/18
[58] Field of Search .............. 33/164 R, 164 B, 165, 33/166

[56] References Cited
UNITED STATES PATENTS

| 1,107,203 | 8/1914 | Savage | 33/164 R |
| 1,133,652 | 3/1915 | May | 33/164 B |
| 2,467,499 | 4/1949 | Sachtleber | 33/164 B |
| 2,690,016 | 9/1954 | Seaholm | 33/164 B |
| 2,933,816 | 4/1960 | Gunther | 33/164 R |
| 3,340,616 | 9/1967 | Mincuzzi | 33/164 R |
| 3,727,318 | 4/1973 | Meier | 33/164 B |

Primary Examiner—Richard E. Aegerter
Assistant Examiner—Willis Little
Attorney, Agent, or Firm—Fleit & Jacobson

[57] ABSTRACT

A system of millesimal linear measure characterized by the simultaneous existence of two micrometric advances: one normal micrometric advance and another supplemental one with as small a pitch as desired. A double entry numeric counter means comprising auxiliary rings which are independent of each other and each of which receives and transmits substantially different movements. The double entry counter means receives a plurality of inputs, a first input representing the differential advance of a screw and the second of which represents a normal advance of the screw.

3 Claims, 6 Drawing Figures

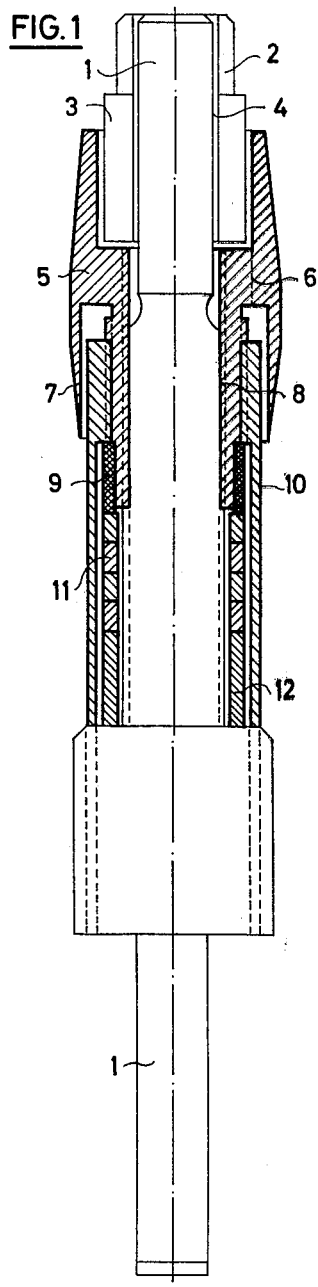
FIG. 1
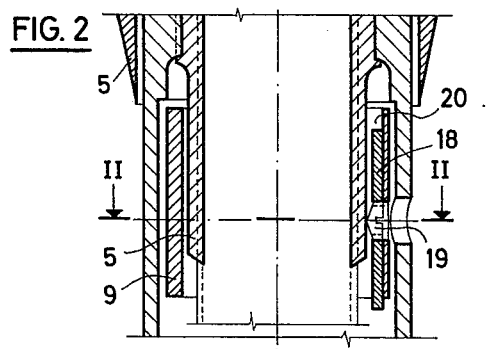
FIG. 2
FIG. 3
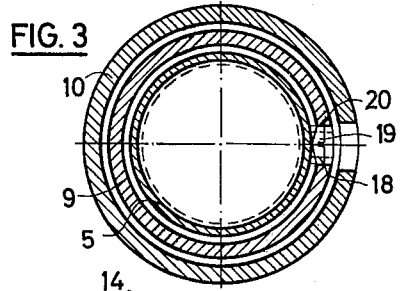
FIG. 4
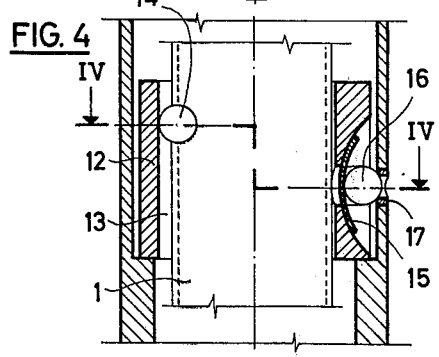
FIG. 5
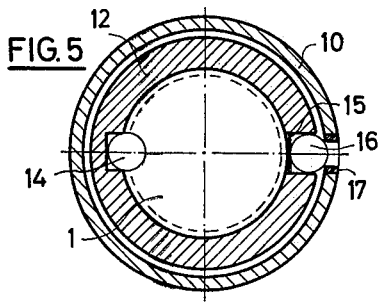

SYSTEM FOR MILLESIMAL MEASURE

This invention concerns a system of millesimal linear measure, applicable to any instrument or measuring mechanism and characterized by the simultaneous existence of two micrometric advances: one normal or conventional micrometric advance and another supplementary one, with as small a pitch as desired, which we might call a differential advance, and which is obtained through a combination of coaxial screw threads by careful selection of normal pitches, all of which permits a reading of greater sensitivity and precision.

Mechanical instruments for linear measure known until now are based on the advance of a micrometric screw which is responsible for the degree of precision obtained, dependent on two principal factors: the quality of manufacture and magnitude of screw pitch.

Other factors being equal, the sensitivity of the measure and therefore, confidence in it, is greater the smaller the pitch is. Now, the obtaining of a very small pitch, under certain values, is limited by the practical reuirements and possibilities involved.

The system being described achieves this greater sensitivity of measurement without being affected by the above-mentioned limitations, reaching almost any pitch desired by compensation of pitches through a differential mechanism.

In this way, the adoption of normal pitches which have been carefully selected results in a differential advance of a potential pitch as small as may be desired.

In order to make the nature, characteristics and advantages of this system clearer, an example of its achievements, though neither exhaustive nor limiting, has been given below, with FIGS. 1, 2, 3, 4, 5, and 6, representing the principal elements included in the description of this invention, which are identified by number.

For purposes of clarity and to avoid the need to repeat the number of the figure being described each time, the same number has been assigned to the same part in all figures.

FIG. 1 is the longitudinal section representing one of the possible forms of practical use of the system schematically.

FIGS. 2 and 4 are longitudinal sections showing in detail parts of FIG. 1.

FIGS. 3 and 5 are transverse sections of FIGS. 2 and 4 as cut by lines II—II and IV—IV, respectively.

Figure 6:
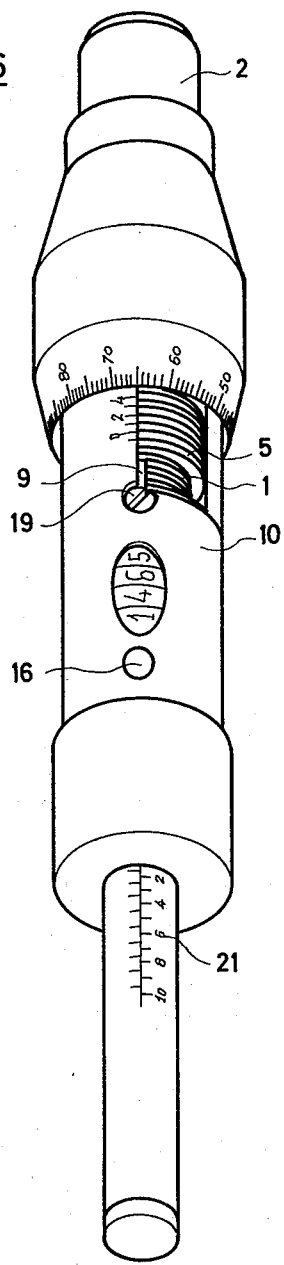
FIG. 6 is the exterior view that demonstrates the two practical possibilities for reading the measurements obtained: reading by scale or, alternatively, by numeric counter.

Thus, with reference to these figures, it can be seen that the principal element is the part we will call the differential cylinder, which is assigned reference number 5 in the figures for purposes of identification. This differential cylinder contains a screw thread with pitch "$p$" suitable for normal micrometric measure of high precision, in which the principal screw of the measure turns 1. The outside of the cylinder carries another screw thread of pitch P, different from the previous one, around which the frame 10 turns. The relationship between both pitches is expressed by the formula: $P = p+d$ with "$d$" as any number, positive or negative. Normally, in practical use, "$d$" could be a decimal number.

Example: Thus, if $p = 0.5$ mm and $d = 0.1$ mm, the value of "$p$" will be: $P = p + 0.1$ mm $= 0.6$ mm.

If the scale reading method is used, zone 7 of this differential cylinder contains, circularly, the measurement scale of the units of the order P-p/n, with "$n$" as the number of divisions of the contour of this scale.

Example: If $P = 0.6$ mm, $p = 0.5$ mm and $n = 100$, a division of the thimble is one thousandth (a millesimal part) of a mm.

The scale of units of the order P-p is arranged according to a generatrix of the sleeve 10. The distance between two consecutive lines on this scale is equal to pitch P but its metrological representation is P-p.

The materialization of the units of the order "$p$" can be accomplished in various ways. FIG. 6, reference 21 shows one of the possible solutions.

If the numerical reading method is used, two independent coaxial numerical counters are involved: a normal one related to the principal screw 1 which indicates the reading of the units of order "P" and another differential one, related to the differential cylinder 5, which indicates the reading of the remaining units; that is, from those of the order P-p to those of P-p/n, all inclusive.

A combined reading is also possible by using, for example, the first counter, called the normal counter, for units of an order above P-p and substituting the differential counter for the corresponding scale reading described previously.

FIGS. 4 and 5 represent one of the possible ways of using the first, or normal, counter, which also includes a mechanism for setting the principal screw 1 in the angular position corresponding to each complete rotation of it. As can be seen from these figures, the principal screw 1 activates the auxiliary activation ring 12 for the normal counter by means of the interposition between both of them of the ball joint 14 located in a spherical socket of the principal screw 1 and sliding the length of a crack 13 placed according to an internal generatrix of the auxiliary ring in question of the normal counter 12 so that the principal screw 1 can be displaced axially both when it turns and when it experiences no turn as a result of having immobilized the movement of the auxiliary ring of the normal counter 12 through the circumstantial inclusion of a ball for positioning and setting 16 in the socket 17 activated by pressing the spring 15.

FIGS. 2 and 3 represent one of the possible solutions for use of the differential counter. As may be seen by these figures, the differential cylinder 5 draws with its rotation the auxiliary activation ring of the differential counter 9 which moves the figures of a counter, represented by 11, composed of as many numerical rings as necessary for measuring the units of P-p to P-p/n.

This auxiliary activation ring of the differential counter 9 serves a triple function:

- It receives at all times the transmission of angular movements from the differential cylinder 5 through the action of the setscrew 19 on the slide 18.

- It permits at all times the freedom of relative axial displacements between this ring and the above-mentioned differential cylinder, by means of the action of the slide 18 which, regulated by the setscrew 19, slides the length of the track 20.

- It permits, at a given moment, through the circumstantial release of the setscrew 19, incidental variation of the relative angular position of the parts formed by the auxiliary activation ring of the differential counter 9 and the differential cylinder 5, for purposes of the regulation and exact position at zero of the instrument readings.

The frame 10 supports the entire system and contains the windows for reading the counters located inside it.

The positioning of the principal screw 1 and differential cylinder 5 can be accomplished by independent operations or a single operation, but always with the corresponding interposition of a coupling or clutch limiter.

FIGS. 1 and 6 represent the operation with two independent controls, the one for quick approximation or advance 2, which acts on the principal screw 1, and the one for differential or slow advance 3 which acts on the differential cylinder 5 by means of the surface of the coupling 4.

Both operate according to their corresponding limiters.

When the differential reading is of the scale type the system can be regulated by dividing the differential cylinder 5 into two parts according to line 6 which are interrelated by a setscrew not represented in the figures, in the case of the reading by numeric counter, by varying the relative angular position of the auxiliary activation ring of the differential counter 9 and differential cylinder, through movement of the setscrew 19 accessible through the frame 10.

The description and illustrations make it evident that in practice all the modifications in detail, while not altering the essence of this invention, may be introduced that are included in the following framework for claims of replevin:

Having sufficiently described the subject of this request, I claim the following details of invention and ownership are declared to be:

1. In a millesimal measure device having screw threads of different pitches which each produce a micrometric advance and in combination produce a differential advance of as small a pitch as desired by subtraction or addition of the pitches used, comprising: a differential cylinder; a first screw thread in the inner surface of said differential cylinder, said first screw thread having a first pitch; a principal screw having a principal screw thread which has a suitable pitch for micrometric measurement, said principal screw thread and said first screw thread being in correspondence; a second screw thread on the outer surface of said differential cylinder, said second screw thread having a second pitch different than said first pitch; an outer frame having windows defined therein a third screw thread on said outer frame whose threads are of suitable pitch for differential measurement said second screw thread and third screw thread being in correspondance a double entry numerical counter means comprising on said principal screw in coaxial disposition with respect to said differential cylinder and enclosed within said frame, a plurality of sleeves each having numerals thereon, a plurality of auxiliary rings which are independent of each other and each associated with one of said sleeves, and means for moving said sleeves, said windows being located to reveal the numerals on said sleeves, each of said auxiliary rings receiving movement information which is substantially different from the movement information received by the other of said auxiliary ring transmitting said substantially different movement information to the sleeve associated therewith whereby said double entry numerical counter means receives information inputs from a plurality of sources and indicates through numerals appearing in said windows a result which represents a combination of the inputs received from said plurality of sources.

2. Millesimal measure device, according to claim 1, wherein the improvement further includes a set screw and wherein said plurality of auxiliary rings includes a first auxiliary ring for transmitting a first entry to said double entry numerical counter means, for differential measurements, of the information representing the angular movements of said differential cylinder, with which said numerical means maintains a constant relative position and, simultaneously, information representing the axial displacement of said differential cylinder that originates the movement, making possible at a given moment representation of information regarding the relative angular variation of that differential cylinder, which relative angular variation can be accomplished through the action of said setscrew.

3. Millesimal measure device, according to claim 2, wherein the improvement further includes a spring and blocking means and said plurality of auxiliary rings further includes a second auxiliary ring for transmitting a second entry to said double entry numerical counter means, said second entry representing the angular movements received from said principal screw which is maintained in a constant angular position relative to said counter means and permitted simultaneously to undergo relative axial displacement, and further including means for setting of coacting parts at a given moment in a predetermined angular position while continuing to preserve axial freedom between one of said auxiliary rings and the principal screw through the action of said spring and blocking means.

* * * * *